United States Patent
Jones et al.

(10) Patent No.: US 7,815,225 B2
(45) Date of Patent: Oct. 19, 2010

(54) SELF RESTRAINED DUCTILE IRON FITTING

(75) Inventors: Jim Jones, Fort Worth, TX (US); Gerardo Darce, Heredia (CR); Randall Chinchilla, San Jose (CR); Bradford G. Corbett, Jr., Fort Worth, TX (US)

(73) Assignee: S & B Technical Products, Inc., Fort Worth, TX (US)

( * ) Notice: Subject to any disclaimer, the term of this patent is extended or adjusted under 35 U.S.C. 154(b) by 208 days.

(21) Appl. No.: 12/199,954

(22) Filed: Aug. 28, 2008

(65) Prior Publication Data

US 2009/0060635 A1 Mar. 5, 2009

Related U.S. Application Data

(63) Continuation-in-part of application No. 12/038,544, filed on Feb. 27, 2008, which is a continuation-in-part of application No. 11/149,988, filed on Jun. 10, 2005, now Pat. No. 7,328,493.

(51) Int. Cl.
*F16L 19/06* (2006.01)
(52) U.S. Cl. ........................ 285/339; 285/343
(58) Field of Classification Search ................. 285/339, 285/343, 332.1
See application file for complete search history.

(56) References Cited

U.S. PATENT DOCUMENTS

| | | | | |
|---|---|---|---|---|
| 3,684,322 A | * | 8/1972 | Kotsakis | 285/343 |
| 3,963,298 A | * | 6/1976 | Seiler | 277/625 |
| 4,693,483 A | * | 9/1987 | Valls | 277/626 |
| 4,805,932 A | * | 2/1989 | Imhof et al. | 285/339 |
| 4,826,028 A | * | 5/1989 | Vassallo et al. | 277/615 |
| 5,067,751 A | * | 11/1991 | Walworth et al. | 285/374 |
| 5,197,768 A | * | 3/1993 | Conner | 285/321 |
| 5,269,569 A | * | 12/1993 | Weber et al. | 285/322 |
| 5,295,697 A | * | 3/1994 | Weber et al. | 277/616 |
| 5,297,824 A | * | 3/1994 | Imhof et al. | 285/374 |
| 5,297,826 A | * | 3/1994 | Percebois et al. | 285/339 |
| 5,360,218 A | * | 11/1994 | Percebois et al. | 285/232 |
| 5,393,107 A | * | 2/1995 | Vobeck | 285/322 |
| 6,142,484 A | * | 11/2000 | Valls, Jr. | 285/232 |
| 6,220,635 B1 | * | 4/2001 | Vitel et al. | 285/337 |
| 6,843,514 B2 | * | 1/2005 | Rex et al. | 285/339 |
| 6,945,570 B2 | * | 9/2005 | Jones | 285/339 |

(Continued)

*Primary Examiner*—David E Bochna
(74) *Attorney, Agent, or Firm*—Charles D. Gunter, Jr.

(57) ABSTRACT

A combination sealing and restraint system for an as-cast ductile iron fitting is shown for both sealing and preventing separation of an iron pipe fitting and a mating male pipe. A ring-shaped body is installed within a mating groove provided in a mouth region of the as-cast fitting after the fitting has been cast at the manufacturing plant. The ring-shaped body carries a gripping member with teeth on an inner surface thereof which are initially angled away from an outer surface of a mating male pipe. The teeth are forced into engagement with the exterior surface of the mating male pipe as the pipe joint at the fitting is assembled. The teeth are oriented to allow movement of the male pipe in a first direction relative to an end opening of the fitting during assembly, but to resist movement in a opposite direction after the fitting joint has been assembled. The ring-shaped body also includes a relatively flexible portion formed of an elastomer which forms a sealing member with the mating male pipe.

4 Claims, 4 Drawing Sheets

U.S. PATENT DOCUMENTS

| | | | |
|---|---|---|---|
| 6,974,160 B2 * | 12/2005 | Jones | 285/339 |
| 7,093,863 B2 * | 8/2006 | Holmes et al. | 285/339 |
| 7,104,573 B2 * | 9/2006 | Copeland | 285/343 |
| 7,207,606 B2 * | 4/2007 | Owen et al. | 285/339 |
| 7,284,310 B2 * | 10/2007 | Jones et al. | 29/447 |
| 7,410,174 B2 * | 8/2008 | Jones et al. | 285/339 |
| 7,537,248 B2 * | 5/2009 | Jones et al. | 285/339 |
| 7,618,071 B2 * | 11/2009 | Jones et al. | 285/343 |
| 2004/0108714 A1 * | 6/2004 | Houghton | 285/110 |

* cited by examiner

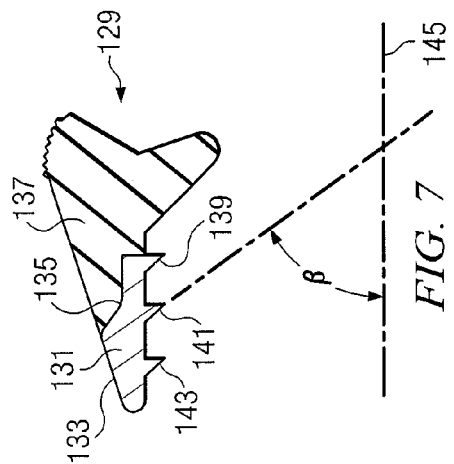
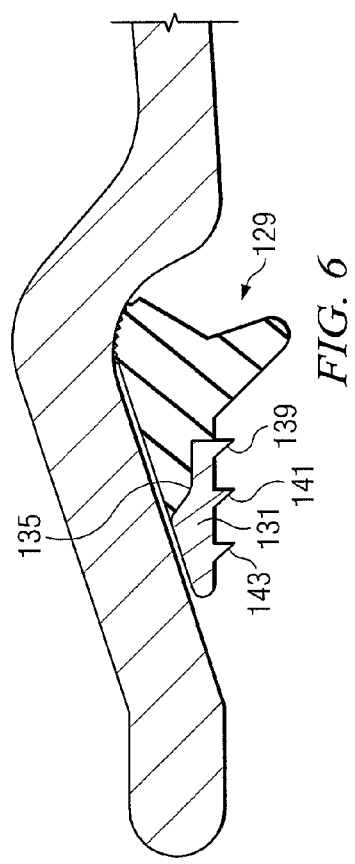
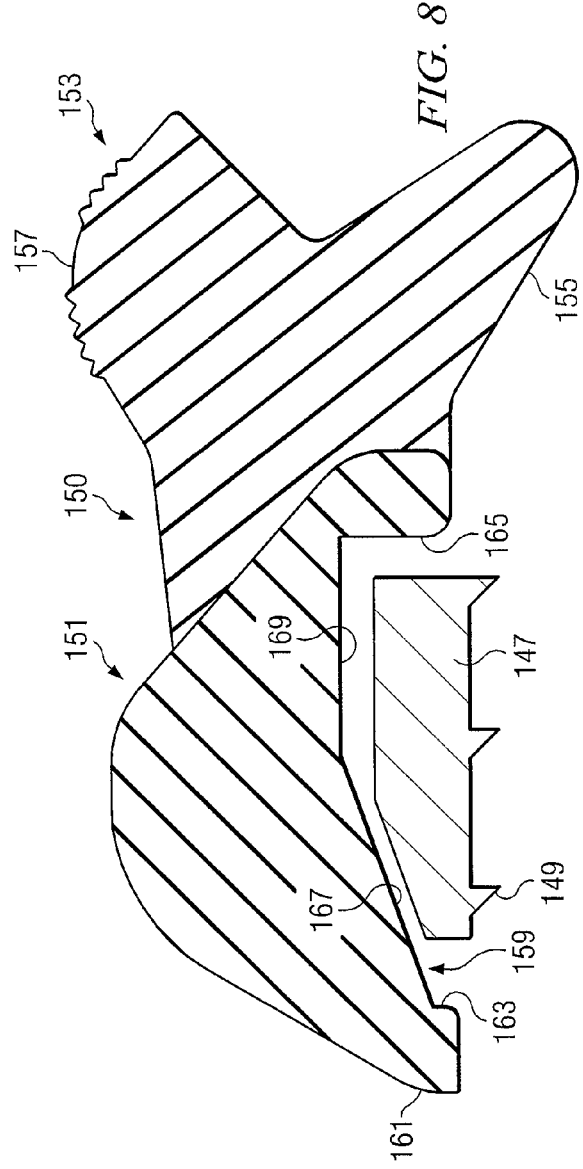

SELF RESTRAINED DUCTILE IRON FITTING

CROSS-REFERENCE TO RELATED APPLICATIONS

The present application is a continuation-in-part of Applicant's prior U.S. application Ser. No. 12/038,544, filed Feb. 27, 2008, entitled "Self-Restrained Ductile Iron Fitting," presently pending, which was, in turn, a continuation-in-part of Ser. No. 11/149,988, filed Jun. 10, 2005, entitled "Self Restrained Fitting for PVC and Ductile Iron Pipe", now U.S. Pat. No. 7,328,493, issued Feb. 12, 2008.

BACKGROUND OF THE INVENTION

1. Field of the Invention

The present invention relates generally to the field of pipe connections for sections of pipe such as those pipes used in the municipal water and sewer pipeline industries. More particularly, this invention relates to a combination sealing and restraint system for use in "as-cast" ductile iron pipeline systems.

2. Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC. Ductile Iron is a high strength, tough material which has traditionally been used in water and wastewater systems in all 50 states of the United States and in many other areas of the world. In the United States alone, it has been in continuous use in hundreds of municipal utility systems for more than a century.

In many applications where lengths of pipe are joined in telescoping relationship, the spigot end of one pipe is inserted into the socket end of the engaging pipe at a pipe joint or "coupling." The socket end has an opening large enough to receive the spigot end of the mating pipe. A gasket is typically present within the socket end of the pipe which is intended to prevent leakage of fluid from the joint by forming a seal between the two pipe sections. Piping systems of the above type also typically include "fittings" as that term is defined in the industry. A fitting is a term which will be familiar to those in the relevant industries and includes a piece, often curved or at an angle, as a coupling, an elbow, a valve, a Tee, etc. used for connecting lengths of pipe or as an accessory to a pipe in a piping system for conveying fluids. Exemplary "as cast" ductile iron pipe fittings are shown, for example, in the Tyler/Union Utilities Mini-Catalogue, May 2001, on pages 2-3, as the "Mechanical Joint C153 Ductile Iron Compact Fittings." These fittings are merely intended to be exemplary, as there are a number of other commercial sources for such pipe fittings.

In addition to pipes and fittings, there are other components in a pipeline system which are placed in fluid communication with a length of pipe, requiring a sealed coupling or joint. For example, there are hydrant tees and valves which are commonly used in most municipal water systems. As an example of such components, American AVK is a leading manufacturer of gate valves, fire hydrants, and accessories for the water, wastewater, fire protection, and irrigation industries and company catalogues illustrate a variety of these general types of products.

One important consideration in piping systems of the above type, whether in a straight run of pipe necessity of providing effective sealing, another important design requirement exists when it becomes necessary to join the pipe components in a restrained manner. This is usually desired in order to prevent the pipe components from separating due to thrust forces that often occur when the pipeline is subjected to internal or external pressures, changes in direction or elevation of the pipeline, and sometimes when earthquakes or tremors or other external factors come into play.

Thus, in a straight section of a ductile iron pipeline, the hydrostatic forces are generally balanced. Wherever the pipeline changes direction or diameter, such as at a bend, tee or a reducer, however, the hydrostatic forces create an unbalanced thrust force in the line. This unbalanced thrust force can cause the line to move or its joints to separate unless the thrust force is counterbalanced in some manner. Where there are only gradual changes of direction in the line, the lateral thrust forces are normally counterbalanced by the friction between the pipe and the soil along the length of piping, and joint restraint is not normally required. However, when higher pressures, poor soil conditions or significant changes of direction or diameter are encountered, the thrust forces may be too great to be resisted by the soil surrounding an unrestrained joint. In the past, these unbalanced thrust forces have commonly been counterbalanced with thrust blocks, restrained pipe joints, or a combination of the two.

Conventional ductile iron pipe joints have been provided of both the "push-on" type joints, as well as the traditional bolted mechanical joints. For example, one of the most common devices for forming a sealed joint in straight runs of pipe referred to above is the "mechanical joint" or "MJ". There, the bell end of an iron pipe section has a cast-on flanged portion on the pipe exterior. The spigot end of a second iron pipe is fitted with a slidable gland fitting and a gasket that is conically shaped such that one face of the gasket is diametrically larger than the second face of the gasket. The conically shaped gasket is positioned between the gland fitting and the spigot end of the pipe with the smaller, second face of the gasket being closer to the spigot end than the larger, first face of the gasket. The gland fitting has a plurality of apertures for receiving standard bolts. The joint is formed when the spigot is axially inserted into the bell, and the gland fitting and the flanged portion are pieces.

While the "internal" gasket used in the traditional MJ design for ductile iron pipe served to seal the joint, the gasket did not feature a cooperating "restraint" feature in order to assure the greater integrity of the joint of pipe. Instead, it was necessary to utilize a cumbersome external mechanical restraint system made up of the flange, bolts, screws, etc., as discussed above. Also, when the pipe component being joined was a fitting rather than a straight run of pipe, there was less room available on the exterior of the fitting to accept the various parts (flanges, bolts, screws, etc.) that were necessary to make up the MJ type restraint.

In order to meet the need for a restrained joint of the above type, a number of companies in the industry have worked to develop various forms of restrained joint products for ductile iron pipelines. These include, for example, the FAST-GRIP® and TR FLEX® restrained push-on joints, the FIELD LOK 350® gaskets used to restrain push-on TYTON®JOINTS, and the more recent MJ FIELD LOK® gaskets which are used to restrain mechanical joint pipe and fittings.

The Ductile Iron Pipe Research Association (DIPRA) has published the "Thrust Restraint Design for Ductile Iron Pipe," a document of conservative design guidelines for the restraint of thrust forces in underground, pressurized, Ductile Iron piping systems. The DIPRA procedures are based on accepted principles of soil mechanics and provide formulas for determining thrust forces and the necessary restraint.

Thus, in spite of improvements in pipeline systems generally, a need continues to exist for an improved sealing and restraint system, particularly for ductile iron pipelines, of the type which offers complimentary sealing and self-restraining features.

A need also exists for such a system which is cost-effective, easy to manufacture and easy to use in the field and which is dependable in operation.

A need also exists for such a system which effectively restrains ductile iron pipes and fittings, as well as hydrant tees and valves, against internal and external forces without the need for an external flange, bolts or associated restraining screw mechanisms.

A need exists, accordingly, for a sealing and restraint system for ductile iron pipelines, and particularly for fittings, which offers complimentary sealing and self restraining features in an internal sealing/restraint system.

SUMMARY OF THE INVENTION

The present invention has as one object to provide a combination sealing and restraint system for insertion within an annular groove within a mouth region located adjacent an end opening of an as-cast ductile iron fitting capable of both sealing and restraining the ductile iron fitting to a mating male pipe having an interior surface and an exterior surface.

In one form, the combination sealing and restraint system includes an annular gasket body made of a resilient elastomeric material, the annular gasket body having an inner circumferential region and an outer circumferential region. When installed within the annular groove provided in the mouth region of the as-cast fitting, the outer circumferential region forms a seal with the fitting mouth region and the inner circumferential region forms a sealing surface for a mating male pipe section. A plurality of generally planar gripping segments extending perpendicularly outward from the annular gasket body at a predetermined spacing around the circumference of the annular gasket body. Each of the gripping segments has an inner planar surface and an outer planar surface separated by a thickness. The inner planar surface has at least one row of gripping teeth capable of engaging selected points on the exterior surface of the mating male pipe.

In this form of the invention, the annular gasket body, when viewed in cross section, includes a leading nose region and a radially inwardly slanting sealing surface which forms a lip seal for engaging the mating male pipe end during insertion. The lip seal surface is joined to a secondary sealing surface, the secondary sealing surface comprising a planar circumferential region which terminates in an inside corner of the gasket. The inside corner is connected to an outer arcuate region of the gasket by a gently sloping exterior gasket surface. The outer arcuate region of the gasket is connected to the nose region of the gasket by a another gently sloping external gasket surface.

Preferably, the generally planar gripping segments are integrally formed into the leading nose region of the annular gasket body during manufacture of the gasket body. For example, the gasket body may be injection molded with the gripping segments being integrally formed into the gasket body during the injection molding operation. The gripping segments extend outwardly from the nose section of the gasket. The outer planar surface of the gripping segments is at least partly covered by the rubber of the nose region of the gasket. The amount of elastomer utilized and the durometer of the elastomer control the force of the gripping tooth engagement with the mating male pipe. In one preferred form of the invention, a plurality of rows of gripping teeth are present on the inner planar surface of the gripping segments. Where two or more rows are present, one row has a greater relative height than the other rows.

In another form of the sealing and restraint system of the invention, the sealing and restraint system includes a ring-shaped body having a relatively rigid, inflexible leading portion and a relatively more flexible trailing portion. The flexible portion is formed of a resilient elastomeric material, the flexible trailing portion of the body having an inner circumferential region and an outer circumferential region. The ring-shaped body is installed within the annular groove provided in the mouth region of the as-cast fitting so that the outer circumferential region forms a seal with the fitting mouth region and the inner circumferential region forms a sealing surface for a mating male pipe section. The relatively rigid leading portion of the ring-shaped body has an exterior surface and an interior surface, and wherein the interior surface includes a C-shaped recess formed therein adjacent a leading nose portion of the ring-shaped body.

A gripping ring is installed within the C-shaped recess provided in the relatively rigid portion of the ring-shaped body. The gripping ring is provided in the form of a continuous circumferential body having a slit at one point in a circumference thereof. The gripping ring is made up of an inner planar surface and an outer planar surface separated by a thickness, and wherein the inner planar surface has at least one row of gripping teeth capable of engaging selected points on the exterior surface of the mating male pipe and apply a gripping force to the exterior surface.

The sealing surface of the trailing portion of the-ring-shaped body extends further radially inward in a direction of a centerline of the mouth opening of the fitting than do the gripping teeth on the inner planar surfaces of the gripping segments. The C-shaped recess provided in the relatively rigid portion of the ring-shaped body includes a sloping wall portion which defines a ramp surface of the gripping ring as the mating male pipe is installed to form a pipe joint. The ring-shaped body can be provided in the form of a dual durometer gasket having a leading portion of a relatively higher durometer rubber and a tailing portion formed of a relatively lower durometer rubber. Alternatively, the leading portion of the ring-shaped body is formed of a hard plastic. The leading portion of the ring-shaped body could also be formed of a metal, a metal alloy, or other relatively rigid material in some cases, depending upon the exact nature of the male pipe being gripped.

A method is also provided for forming a pipe joint with the sealing and restraining system described above. To begin, a fluid piping system is provided which has one or more as-cast ductile iron pipe fitting, previously cast at a foundry, each having a mouth region adjacent an end opening thereof. The mouth region has an annular groove therein, and the end opening of the fitting is sized to receive a mating male pipe having an interior surface and an exterior surface. In a post-casting operation, the sealing and restraining system is installed within the annular groove provided in the end opening of the as-cast fitting. A mating male pipe is installed within the end opening of the mouth region of the as-cast fitting by pushing the male pipe within the end opening, and the sealing and restraint system contacts the external surface of the mating male pipe in order to both seal and restrain the mating male pipe and form a secure joint.

Additional objects, features and advantages will be apparent in the written description which follows.

BRIEF DESCRIPTION OF THE DRAWINGS

FIG. 6 is a side, partial sectional view which shows another form of the sealing and restraint system of the invention in which the rubber of the nose region of the gasket partially covers the outer planar surface of a series of gripping elements.

FIG. 7 is an isolated, cross-sectional view of the sealing and restraint system used in FIG. 6.

FIG. 8 is a side, partial sectional view of a further evolution of the sealing and restraint system of the invention in which a C-shaped recess formed in a nose region of a surrounding body receives a rigid gripping ring.

DETAILED DESCRIPTION OF THE INVENTION

Figure 1:
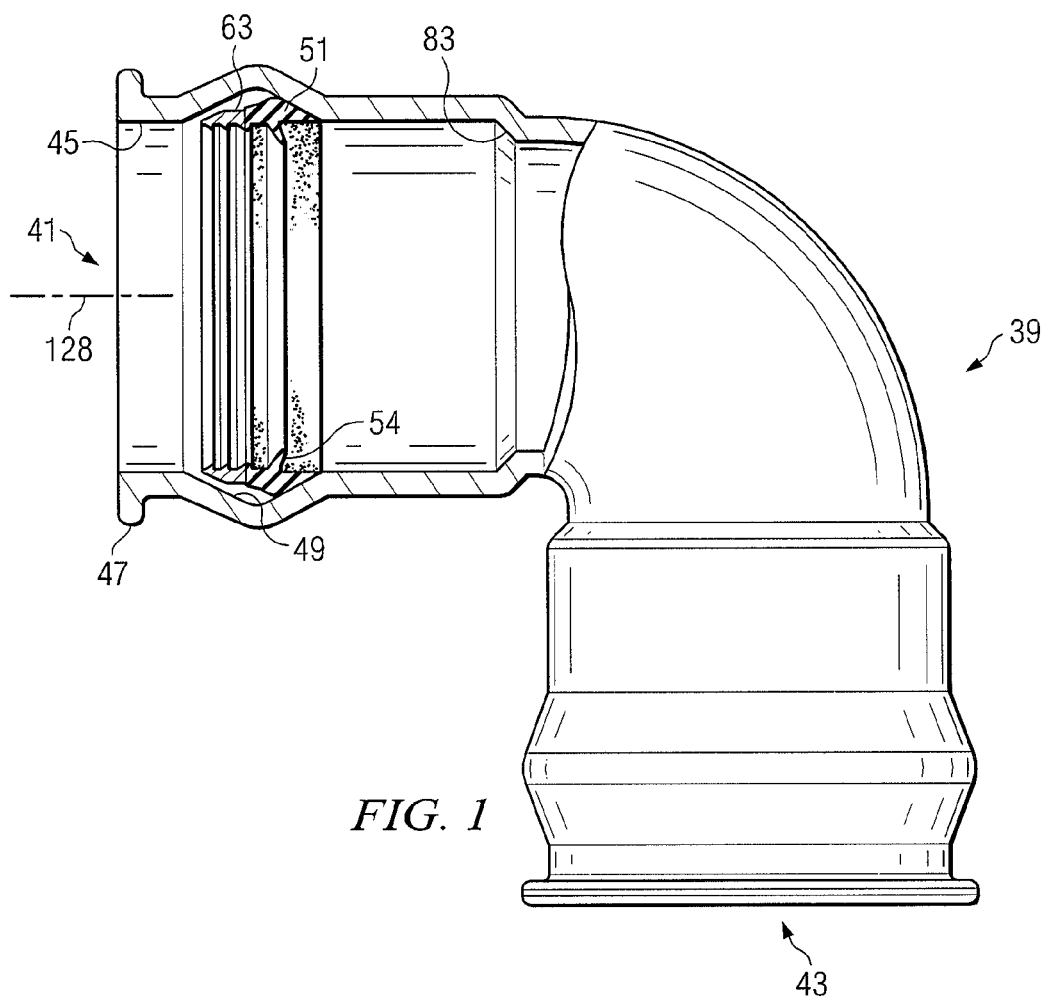
FIG. 1 is a perspective view, partly broken away, of an as-cast ductile iron pipe fitting showing one version of the combination sealing and restraint system of the invention in place within a mouth region of the fitting.

The present invention deals with piping systems of the type used in water, sewage and other municipal fluid conveyance systems. In the past, such pipelines were traditionally formed of a ferrous metal. By "ferrous metal" is meant iron and alloys of iron. For example, one type of ferrous metal which is commonly encountered in the water works industry is "ductile iron." This particular type of metal is widely used because it offers a combination of a wide range of high strength, wear resistance, fatigue resistance, toughness and ductility in addition to the well-known advantages of cast iron-castability, machinability, damping properties and economy of production. It takes its name from the fact that it is "ductile" in nature, rather than being brittle, as was the case with earlier cast iron products and materials. Today, grades of ductile iron are available offering the option of choosing high ductility with grades guaranteeing more than 18% elongation, or high strength, with tensile strengths exceeding 120 ksi (825 MPa). Austempered ductile iron (ADI), offers even greater mechanical properties and wear resistance, providing tensile strengths exceeding 230 ksi (1600 Mpa).

In forming a pipeline of ductile iron components, one end of each section is typically enlarged, forming a "bell" at one end sufficient to join the next adjacent pipe section by receiving in the belled end the unenlarged or "spigot" end of the next adjacent length of pipe within the bell end opening. The inside diameter of the bell is formed sufficiently large to receive the spigot of the next section of pipe with sufficient clearance to allow the application of an elastomeric gasket or other sealing device designed to prevent leakage at pipe joints when a plurality of pipe lengths are joined to form a pipeline.

Straight runs of ductile iron pipe of the above type have, for many years, been joined by utilizing an elastomeric gasket which is compressed between the inside walls of the bell and the outside wall of a mating spigot end of the next pipe in a series of telescoped pipes. The gasket is typically retained within the groove provided in the bell end opening of the female pipe section. However, as discussed above, one problem which exists is finding a way to "restrain" the assembled pipe joints so that the joint will not be separated due to internal or external pressure, or due to environmental factors such as earth movement.

As mentioned in the background discussion of the invention, the iron pipe industry has generally addressed the problem of providing a restrained pipe joint by utilizing an external sealing "gland" or flange, sometimes referred to as a "mechanical joint" or simply as an "MJ". The MJ style restraint has worked satisfactorily in the past on straight runs of pipe. However, fittings typically do not present as large an exterior surface for receiving the various components needed to make up the MJ type restraint. Also, an internal combination sealing and restraint system would offer greater ease and speed of assembly in the field. Because the gripping components would be internal rather than external, there would be less opportunity for corrosion of the metallic components in use.

Figure 5:
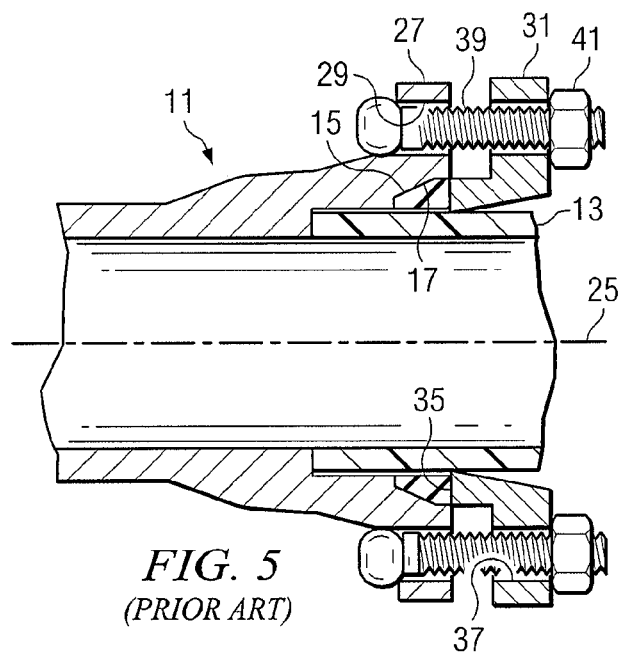
FIG. 5 is a partial sectional view of a prior art MJ style pipe coupling system.

Turning to FIG. 5, there is shown a typical mechanical joint, or "MJ", of the prior art. The joint shown in FIG. 5 is formed between a pipe bell end 11 of one ductile iron pipe and the plain spigot end 13 of a second ductile iron pipe. The second pipe 13 is inserted into the belled end 11 of the enclosing pipe. The inner surface of the pipe bell end 11 has a retainer groove 17 for retaining a gasket 15. The belled pipe end 11 also has a flanged region 27 which includes a plurality of apertures 29. A circumferential gland 31 is sized to be received about an outer surface of the mating male ductile iron pipe. The gland 33 has a forward lip portion 35 which contacts and compresses the body of the gasket 15 as the joint is assembled. The gland 31 also has a plurality of apertures 37 which are arranged to be aligned with the apertures in the flange collar region of the bell pipe end. Bolts 39 and nuts 41 are used to join the apertures of the bell pipe end and the gland as shown in FIG. 5.

While the mechanical joint illustrated in FIG. 5 has been utilized for a number of years in the industry, it is somewhat cumbersome and time consuming to assemble. Additionally, the external metallic components are subject to wear, damage and corrosion. As mentioned above, it may be too bulky for use on some fittings. The present invention, therefore, has particular application to as-cast "fittings" which are used to make up a joint between two plain end pipe sections. By "as-cast" is meant that no additional machining is involved to form the bell, as with traditional systems. Traditional "as-cast fittings" of the general type under consideration are commercially available from a number of sources, for example, the Tyler Pipe/Utilities Division of Union Foundry Company located in Anniston, Ala., as previously mentioned in the Background discussion.

In the discussion which follows, the invention will be primarily described with respect to ductile iron pipelines where one length of ductile iron pipe is being joined to a subsequent length of ductile iron pipe and where both pieces of pipe are formed of iron. However, those skilled in the art will realize that many of the principles involved would apply to "hybrid" systems in which the mating male pipe could also be formed of another material, such as a suitable plastic such as PVC or a suitable polyolefin such as polyethylene. Such "hybrid" systems are becoming increasingly common in use in the rehabilitation of existing ductile iron pipe lines. The same type combination sealing and restraint to be described could also be used in the mouth region of a ductile iron fitting and would operate in the same manner in forming a secure joint with a mating male pipe section. Thus, in the discussion which follows, the terms "pipe" and "pipe/fitting" are intended to cover, in addition to pipes and fittings, other components in a pipeline system which are placed in fluid communication with a length of pipe, requiring a sealed coupling or joint. For example, there are hydrant tees and valves which are commonly used in most municipal water systems. As has been mentioned, American AVK is a leading manufacturer of gate valves, fire hydrants, and accessories for the water, wastewater, fire protection, and irrigation industries and company catalogues illustrate a variety of these general types of products.

FIG. 1 illustrates an as-cast ductile iron elbow fitting which has installed therein one version of the combination sealing and gripping restraint system of the invention. The as-cast fitting 39 illustrated in FIG. 1 has opposing end openings 41, 43. Each end opening has an adjacent mouth region (45 in FIG. 1) and can be provided with a slight upset 47. It is not necessary that the upset 47 be provided as an apertured flange, however. An annular groove 49 is provided within the mouth region 45 slightly spaced back from the end opening 41.

Figure 4:
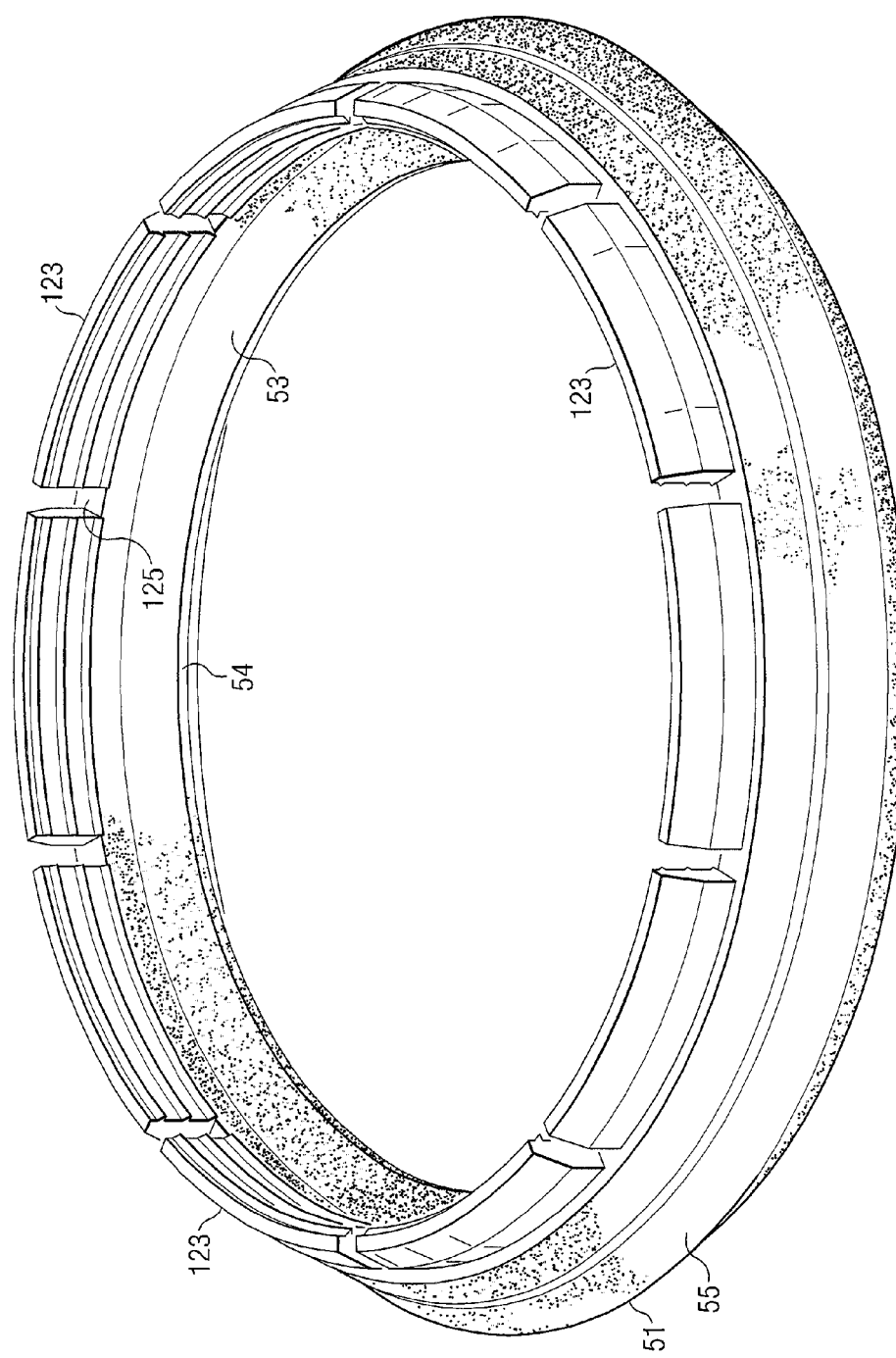
FIG. 4 is a perspective view of one version of the combination sealing and restraint system of the invention.

The combination sealing and restraint system shown in FIG. 1 includes an annular gasket body 51 (FIG. 1) having an inner circumferential region 53 and outer circumferential region 55 (see FIG. 4). The annular gasket body 51 (FIG. 1) is installed within the annular groove 49 provided in the mouth region 45 of the as-cast fitting so that the outer circumferential region 55 forms a seal with the fitting mouth region and the inner circumferential region 53 forms a sealing surface for a mating male pipe section. The lip region 54 of the inner circumferential region 53 forms a primary lip seal for engaging the mating male pipe end during insertion.

FIGS. 1-4 illustrate one version of the combination sealing and restraint system under consideration. Turning to FIG. 3B, the combination sealing and restraint system includes the previously described sealing gasket body, designated generally as 101, together with an integral restraint system. The gasket portion of the device (indicated generally at 101 in FIG. 3B) includes a leading nose region 103 which is joined to a radially inwardly slanting sealing surface 105. The inwardly slanting sealing surface 105 extends outwardly to form a lip seal region 107 for engaging the mating male pipe end during insertion. Whether the gasket body features a lip seal, as shown in FIG. 3B, or more of a bulbous "compression seal region", the sealing surface of the gasket body will generally extend further radially inward (toward the centerline of the pipe) than the gripping surfaces of the companion gripping segments (123 in FIG. 3B).

The lip seal region 107 of the gasket body is joined to a secondary sealing surface 111. The secondary sealing surface 111 comprises a generally planar circumferential region 113 which terminates in an inside corner 115 of the gasket. The inside corner 115 is connected to an outer arcuate region 117 of the gasket by a gently sloping exterior gasket surface 119. The outer arcuate region 117 of the gasket is connected to the nose region 103 of the gasket by a downwardly sloping external gasket surface 121.

A plurality of integrally formed gripping segments 123 (see FIG. 4) extend perpendicularly outward from the nose region 103 (FIG. 3B) of the annular gasket body 101 at a predetermined spacing around the circumference of the annular gasket body 101. By "extending perpendicular outward" is meant that the segments extend generally along a 180 degree axis from the inside corner 115 of the gasket body. In the example shown, there are ten evenly spaced gripping segments. The gripping segments are typically formed of a metal such as steel, although the segments might be formed of a hard plastic where the mating male pipe to be gripped is formed of, for example, PVC. The number of gripping segments will vary depending upon the diameter of the sealing and gripping assembly. For example, in the case where the annular gasket body 101 has a six-inch diameter, nine separate gripping segments 123 will typically extend outwardly around the circumference of the gasket body 101. The gripping segments 123 are generally planar with a length, a width, an inner circumferential surface and an outer circumferential surface separated by a thickness. There exists a series of generally uniform gaps or spaces (generally shown at location 125 in FIG. 4) between each adjacent gripping segment. The gaps 125 between the metallic gripping segments 123 provide some degree of flexibility for the assembly, thereby facilitating its installation within the mouth region 41 of the pipe fitting 39. In some forms of the invention, the gaps 125 may be filled with rubber which is extruded as a part of the sealing gasket body, as well.

The gripping segments are preferably integrally formed into the leading nose region of the annular gasket body during manufacture of the gasket body. For example, the gasket body may be injection molded with the gripping segments being integrally formed into the gasket body during the injection molding operation. In that event, a portion of the length of the gripping segments would be enclosed within or be embedded within the elastomeric body of the sealing gasket. Alternatively, it may be possible to glue or otherwise adhere the gripping segments to the elastomeric gasket body in some circumstances so that the segments are held in the position shown in FIG. 4.

Figure 3A:
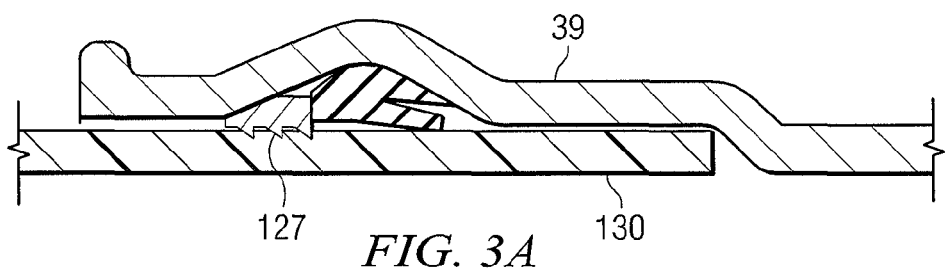
FIG. 3A is a partial, sectional view of one end of the pipe fitting of FIG. 1, illustrating the assembly of the male pipe end.
Figure 3B:
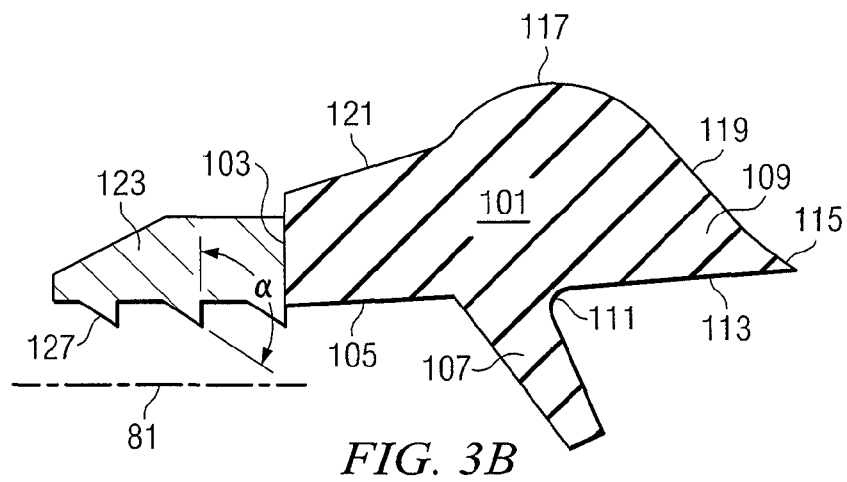
FIG. 3B is a sectional view of the combination sealing and restraint system of FIG. 3A.

The inner planar surface of each gripping segment 123 has at least one row of teeth 127 capable of engaging selected points on the exterior surface of the mating male pipe. In the version of the device illustrated in FIG. 3B, there are three rows of teeth 127 on the inner planar surface. As illustrated in FIG. 3B, the teeth are formed on an acute angle "α" with respect to a horizontal axis (illustrated as 81 in FIG. 3B) of the mouth opening 45 once assembled within the as-cast fitting 39. The shape and inclined angle of the teeth allow a mating male pipe end to be received within the end opening 41 of the fitting 39 and move in a direction from left to right as viewed in FIG. 3A. However, the shape and inclined angle of the teeth 127 resist opposite relative movement of the mating male pipe 130 and thereby exert a restraining force on the mating male pipe 130 once the male pipe has be fully inserted into the fitting 39.

Figure 2:
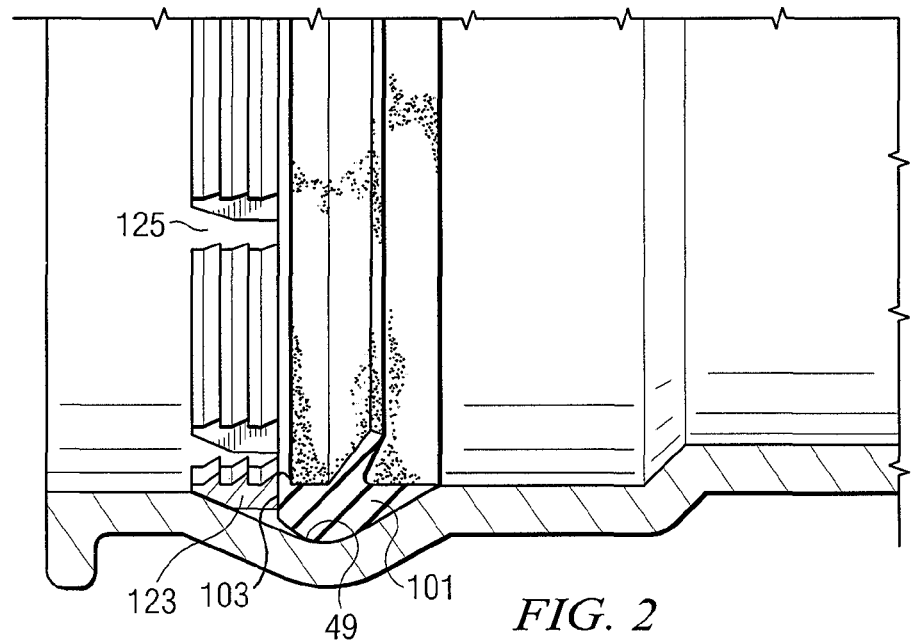
FIG. 2 is a partial sectional view of one end of the ductile iron pipe of FIG. 1 showing the combination sealing and restraint system thereof in greater detail.

FIG. 2 provides an enlarged quarter-sectional view of one end of the ductile iron pipe of FIG. 1, specifically showing the combination sealing and restraint system thereof in greater detail. The annular gasket body 101 of the sealing and restraint system is shown installed within the annular groove 49 provided in the mouth region of the as-cast fitting. The gripping segments 123 extend outwardly from the nose region 103 of the annular gasket body 101. As mentioned, there is a slight space between each gripping segment, as shown at location 125 which is either open, or which is filled with rubber.

As has been mentioned, the mating male pipe may be made from a plastic material, such as from PVC, or from iron. In the case where the mating male pipe is formed of iron, the gripping segments are preferably formed of hardened steel which has been treated to at least about 370 Brinell hardness (BHN) so that the gripping teeth of the segments can penetrate the mating male iron pipe exterior surface or form a buttress on the pipe surface.

FIGS. 6 and 7 show a further evolution of the sealing and restraint system of the invention, designated generally as 129. The sealing and restraint system 129 is generally similar to that which has been previously described with respect to FIGS. 1-4. However, as best appreciated from the isolated view of FIG. 7, it will be seen that the gripping segments 131 have a ramped exterior region 135 on their rear extents which is made up of a horizontal portion joined to an angularly sloped portion, the region 135 having at least a slight covering of rubber material. This is conveniently achieved as a part of the injection molding process of the elastomer portion 137. By providing a rubber covering layer on the outer planar surface of the gripping segments, the force which the teeth (139, 141 in FIG. 6) apply to the mating male pipe end can be more fully controlled. In other words, the amount of rubber present on the outer planar surfaces 135 and the durometer of the rubber will determine the amount of ultimate force which the combined sealing and restraint system applies to the mating male pipe. The ramped exterior region 135 is joined to a downwardly sloping exterior surface (133 in FIG. 7) which terminates in a leading nose region of the gripping segment. It will be noted that the downwardly sloping exterior surface 133 is free of rubber.

In the preferred form, the rubber region which extends from the elastomer portion 137 is a continuous ring shape with a recess being formed on an interior surface thereof for receiving the gripping segments 131. With further reference to FIGS. 6 and 7, the gripping segments 131 are formed with three rows of gripping teeth 139, 141, 143. Note that the teeth may be provided with a slight "hook" or backward angle "β" with respect to the central axis 145 of the female belled pipe end. In other words, the angle "β" is not perpendicular to the longitudinal axis 145. Where the gripping elements have more than one row of teeth, one row will typically be taller than the other rows. For example, in FIGS. 6 and 7, the row 143 is taller, i.e., of greater relative height, than rows 139 and 141, respectfully.

FIG. 8 of the drawings shows a final evolution of the sealing and restraint system of the invention in which a continuous hardened gripping ring 147 is utilized, rather than using a series of separated gripping segments. The preferred gripping ring is a single piece, continuous ring formed of a hard metal and having a slit at one circumferential location which creates at least one gap, the gap being defined between two opposing faces of the gripping ring when the ring is in a relaxed state. The gripping ring (shown as 147 in FIG. 8) has a series of rows of gripping teeth (such as row 149) for gripping the mating male pipe end. As has been mentioned, the mating male pipe may be made from a plastic material, such as from PVC, or from iron. The exact material characteristics for the ring and number and shape of the gripping teeth will be dictated by the material of the mating male pipe being gripped. For example, where the mating male pipe is formed of iron, the gripping ring may be formed of hardened steel which has been heat treated to at least about 370 Brinell hardness (BHN) so that the teeth of the ring can penetrate the mating male iron pipe exterior surface or form a buttress on the pipe surface. In the case where the mating male pipe 45 is formed of plastic, such as from PVC, the ring can be manufactured as described in U.S. Pat. No. 7,125,054, issued Oct. 24, 2006, entitled "Self Restraining Gasket and Pipe Joint", assigned to the assignee of the present invention.

The ring 53 is also preferably coated with a low-coefficient of friction synthetic coating. This coating is preferably an AquaArmor® inner coat to which is applied a top coat of a suitable synthetic polymer. Coating of the ring could not be done if the ring was cast into the body of the bell in the foundry. The AquaArmor® coating is described in patent publication no. 20070196585, "Method of Applying a Phenolic Resin Corrosion Protective Coating to a Steel Component", published Aug. 23, 2007. There, a method is shown for corrosion protecting both ductile iron and steel components in which a surface of the component is coated with a corrosion resistant coating which is an aqueous phenolic resin dispersion. The component is dipped in a bath of the corrosion resistant coating and then baked, dried and cooled. An electrostatic powder coating can be applied over the base phenolic resin coating for added corrosion protection and durability.

The preferred top coat which is applied to the gripping ring 53 is a synthetic polymeric coating. The selected synthetic polymer is preferably thermoplastic and can be selected from such materials as polyvinyl chloride, fluoroplastic polymers, nylon, and the like, depending upon the end application of the pipe joint. The preferred coatings are fluoroplastic polymers, sometimes referred to as "fluoroelastomers." These materials are a class of paraffinic polymers that have some or all of the hydrogen replaced by fluorine. They include polytetrafluoroethylene, fluorinated ethylene propylene copolymer, perfluoroalkoxy resin, polychloro-trifluoroethylene copolymer, ethylene-tetra-fluoroethylene copolymer, polyvinylidene fluoride and polyvinyl fluoride. Fluoroplastics have a low coefficient of friction, especially the perfluorinated resins, giving them unique nonadhesive and self lubricating surface qualities.

One particularly preferred polymer for the top coat is polytetrafluoroethylene (PTFE). This material is a completely fluorinated polymer manufactured by free radical polymerization of tetrafluoroethylene. With a linear molecular structure of repeating —CF2-CF3-units, PTFE is a crystalline polymer with a melting point of 327 degrees C. Density is 2.13 to 2.19 g/cc. PTFE's coefficient of friction is lower than almost any other known material. It is available in granular, fine powder (e.g., 0.2 micron), and water based dispersion forms. In the United States, PTFE is sold as "TEFLON" by Du Pont de Nemours Co.

The non-stick, anti-friction coating used in the method of the invention can be applied by spraying on as a dry powder, followed by heating to fix or cure the coating. The techniques used can vary from conventional air atomized spray coating using a spray gun to such techniques as electrostatic deposition.

For electrostatic deposition, individual particles of polymer powder are statically charged and applied to the gripping ring surfaces, preferably at ambient temperatures. The gripping ring exterior surfaces can be coated using a variety of manual and automatic electrostatic application equipment including electrostatic air atomized, airless, air-assisted airless and rotary atomized powder particles are negatively charged by either direct contact charging or by high voltage ranges from 60,000 to 120,000 volts with very low electrical currents (100 to 200 microamperes). The negatively charged particles seek a positively grounded object to satisfy the negative charge potential. The electrostatic force is so great that powder particles traditionally lost by overspray and bounceback from conventional air-atomized spray are attracted to the grounded part.

The dry powders can also have a color additive, such as a suitable pigment, dispersed therein which impart a distinctive color to the coated region of the gasket. Color markings of this type can be used for product identification purposes, e.g., for use as a water pipe joint, a sewer pipe joint, etc.

After application of the dry powder to the substrate, the gripping ring will typically be heated, either reflectively or in an oven, to fix or set the coating. The exact temperature employed will depend upon the particular fluoropolymer chosen and the manufacturer's recommendation.

The sealing and restraint system of FIG. 8 has a ring-shaped body 150 made up of a forward, relatively rigid portion 151 and a rearward, relatively flexible portion 153 which form both a sealing function and a "housing" function for the combination sealing and restraint system of the invention. The annular gasket portion of the body (shown generally at 153) includes an annular gasket body at least a portion of which is made of a resilient elastomeric material. The annular gasket body 150 has an inner circumferential region 155, in the form of a lip seal region, and an outer circumferential region 157 which may present a slightly roughened exterior surface to enhance retention in a mating pipe groove provided as a part of the as-cast profile within the mouth region of the ductile iron pipe/fitting. In this way, the outer circumferential region 157 forms a seal with the pipe/fitting mouth region and the inner circumferential region 155 forms a sealing surface for a mating male pipe section. The gasket body is installed within the pipe recess after the ductile iron pipe has been formed during the pipe casting operation.

In one form of the invention, the body 150 is provided in the form of a dual durometer gasket, such as the gasket shown in U.S. Pat. No. 5,213,339, issued May 25, 1993, to Walworth, and assigned to the assignee of the present invention. Dual durometer gaskets of this overall type will be familiar to those skilled in the relevant industries. The gasket shown in the '339 patent includes front and back regions, the front region being resilient and relatively rigid, the back region being softer and more resilient than the front region. An interior tip of the back region sealingly engages the exterior surface of the mating male pipe. The exterior tip of the back region in cooperation with the front and back regions, both secures and seals the front and back regions within the profile provided in the pipe mouth region before the insertion of the mating male pipe.

In the case of the dual durometer gasket shown in U.S. Pat. No. 5,213,339, the relatively rigid region was constructed of elastomeric materials having a Shore A durometer of about 75 to 95. Elastomers are commonly known in the art and are widely available commercially. The relatively softer region was constructed out of elastomers having a Shore A durometer of about 40 to 65. In the case of the present invention, the relatively rigid front region 151 may be formed of a hard plastic such as a rigid polyurethane, a rigid acrylic, or even of a metal or metal alloy. Where a dual durometer elastomer is utilized, the two portions of the body 150 will generally be integrally formed during an injection molding operation. Where a hard plastic or metal is utilized, it may be necessary to glue or otherwise adhere the two portion of the body 150 together.

With reference again to FIG. 8 of the drawings, the front portion of the body 150 includes a generally "C-shaped" recess 159 formed just inside the nose region 161 of the rigid portion 151 of the body. The C-shaped recess is defined by perpendicular end regions 163, 165 and a bottom wall region which is made up of a front sloping portion 167 which continues into a rear sloping region 169. The front sloping region 167 forms a "ramp" region during the pipe make-up.

The operation of the sealing and restraint system of the invention will now be briefly described. The system will typically be utilized with a fluid piping system which includes one or more as-cast ductile iron pipe fittings. With reference to FIG. 1, the as-cast fitting 39 typically requires no modification from the item typically produced as-cast from the foundry. As mentioned earlier, it is not necessary for the upset 47 to be provided with apertures for receiving connecting bolts since the internal restraint system of the invention replaces the prior art external components. The combination sealing and restraint system is then typically installed within the internal groove 49 provided within the mouth region 45 of the fitting. The sealing and restraint body 150 is installed within the annular groove 49 so that the outer circumferential region forms a seal with the fitting mouth region and the inner circumferential region forms a sealing surface for a mating male pipe section.

As has been mentioned, the combination sealing gasket and gripping mechanism is inserted within the pipe mouth opening in a post cast operation, thus requiring the body to retain some degree of flexibility for ease of insertion. This can be conveniently accomplished by providing the body 150 as a dual durometer gasket, and by providing the gripping ring 147 as a separate piece with a slit at one portion in the circumference thereof, allowing the ring 147 to be compressed slightly and inserted into the recess 159 after the body 150 is installed. This means that the gripping ring will be expanded at least slightly to pass over the outer diameter of the mating male pipe end. The inner circumferential surface of the gripping segments, with the rows of gripping teeth 127 will then engage selected points on the exterior surface of the mating male pipe.

Once the sealing and restraint gasket is in place, the mating male pipe is installed within the end opening of the mouth region of the as-cast fitting by pushing the male pipe within the end opening. Upon insertion of the male pipe end, the sealing and restraint system contacts the external surface of the mating male pipe in order to both seal and restrain the mating male pipe and form a secure pipe joint.

An invention has been provided with several advantages. The combination sealing and restraint system of the invention is capable of joining and sealing an as-cast ductile iron fitting to a mating male pipe section. The system of the invention is simple in design and economical to manufacture and does not require any drastic changes in existing ductile iron components. The present invention can be used to join ductile iron fittings to mating pipe sections without the need for external mechanical restrain components which complicate assembly and can be subject to corrosion or deterioration in use. By providing the gripping portion of the device as individual gripping segments with a backing of elastomer from the sealing gasket body, the ultimate gripping force of the gripping teeth can be more effectively controlled. Changing the amount of rubber, or the durometer of the rubber, changes the amount of force applied to the external surface of the mating male pipe. The shaped recess for receiving a continuous gripping ring.

While the invention has been shown in several of its forms, it is not thus limited but is susceptible to various changes and modifications without departing from the spirit thereof.

We claim:

1. A combination sealing and restraint system for insertion within an annular groove provided within a mouth region located adjacent an end opening of an as-cast ductile iron fitting capable of both sealing and restraining the ductile iron fitting to a mating male pipe having an interior surface and an exterior surface, the sealing and restraint system comprising:
   a ring-shaped body having a relatively rigid, inflexible leading portion and a relatively more flexible trailing portion, the flexible portion being formed of a resilient elastomeric material, the flexible trailing portion of the body having an inner circumferential region and an outer circumferential region, the ring-shaped body being installed within the annular groove provided in the mouth region of the as-cast fitting so that the outer circumferential region forms a seal with the fitting mouth region and the inner circumferential region forms a sealing surface for a mating male pipe section;

wherein the relatively rigid leading portion of the ring-shaped body has an exterior surface and an interior surface, and wherein the interior surface includes a C-shaped recess formed therein adjacent a leading nose portion of the ring-shaped body;

a gripping ring installed within the C-shaped recess provided in the relatively rigid portion of the ring-shaped body, the gripping ring being a continuous circumferential body having a slit at one point in a circumference thereof and being made up of an inner planar surface and an outer planar surface separated by a thickness, and wherein the inner planar surface has at least one row of gripping teeth capable of engaging selected points on the exterior surface of the mating male pipe and apply a gripping force to the exterior surface;

wherein the sealing surface of the annular gasket body extends further radially inward in a direction of a centerline of the mouth opening of the fitting than do the gripping teeth on the inner planar surfaces of the gripping segments; and wherein the C-shaped recess provided in the relatively rigid portion of the ring-shaped body includes a sloping wall portion which defines a ramp surface of the gripping ring as the mating male pipe is installed to form a pipe joint.

2. The combination sealing and restraint system of claim 1, wherein the ring-shaped body is formed as a dual durometer gasket having a leading portion of a relatively higher durometer rubber and a trailing portion formed of a relatively lower durometer rubber.

3. The combination sealing and restraint system of claim 1, wherein the leading portion of the ring-shaped body is formed of a hard plastic.

4. The combination sealing and restraint system of claim 1, wherein the leading portion of the ring-shaped body is formed of a metal.

* * * * *